United States Patent

[11] 3,628,474

[72] Inventor Charles A. Rehwaldt
913 6th Ave. S., St. Cloud, Minn. 56301
[21] Appl. No. 35,350
[22] Filed May 7, 1970
[45] Patented Dec. 21, 1971

[54] CHARCOAL STARTING APPARATUS
3 Claims, 4 Drawing Figs.
[52] U.S. Cl..................................... 110/1 F,
44/35, 126/25 B, 211/181, 219/260, 224/48 W
[51] Int. Cl..................................... F23b 3/00
[50] Field of Search........................... 219/260,
261, 267, 270; 110/1 F, 8 E, 28 D; 126/59, 5, 25 B;
317/79, 98; 44/35, 39; 99/410–411; 211/181;
224/45 P, 45 E, 48 W, 48 R

[56] References Cited
UNITED STATES PATENTS
3,529,557 9/1970 Treanor........................ 219/260
3,413,935 12/1968 Behrns......................... 110/1 F
2,939,773 6/1960 Rymer.......................... 219/261 UX
2,920,243 1/1960 Taren........................... 219/267 X
3,073,263 1/1963 Wynkoop....................... 110/1 F
3,177,826 4/1965 Cohen.......................... 110/1 F
2,982,840 5/1961 McCutcheon................... 219/267 X Primary Examiner—Volodymyr Y. Mayewsky
Attorney—John W. Adams ABSTRACT: A charcoal starting apparatus consisting of a basket formed of wire mesh forming upstanding sidewalls, the end portions of which are in spaced-apart relationship so as to form a slot in the upstanding sidewall of the basket and having a handle element mounted across the slot of the basket to form a connection between the end portions of the mesh and provide a support for an electric starting device to be removably placed thereon with the electric element thereof extending through the slot.

PATENTED DEC 21 1971

3,628,474

INVENTOR.
CHARLES A. REHWALDT
BY
John W. Adams
ATTORNEYS

CHARCOAL STARTING APPARATUS

The subject matter of this application is related to my pending application Ser. No. 6,056, filed Jan. 27, 1970, and entitled CHARCOAL STARTER ASSEMBLY.

It is desirable to have a cheap and efficient apparatus to assist in the starting of a charcoal fire for such purposes as outdoor cooking, as it is difficult to effectively light an entire bed of charcoal lying loosely in a fire box or grill pan. Accordingly, I have provided a cheap and efficient apparatus to be used as an aid to persons desiring to start a charcoal fire by means of an electric heating element.

Briefly, my invention consists of the provision of a basket assembly consisting of a basket and a handle. The basket is formed of a mesh of material, the mesh being formed of strands spaced sufficiently close together to retain charcoal briquets and formed in a nearly closed loop, so as to form a slot in the up-standing side wall of the basket. A manipulating handle is mounted on the basket to extend outwardly from the slot and which serves the additional function of holding the ends of the mesh material in spaced-apart relation to maintain the rigidity of the basket assembly and maintain the size of the vertical slot in the basket side wall. The handle element is used as a resting place for an ordinary electric charcoal starter, the electric element of which passes through the slot in the up-standing wall of the basket assembly and into the interior area defined by the basket in which charcoal is placed for the purpose of being ignited.

Accordingly, an object of this invention is to provide a cheap and efficient basket assembly formed of a nearly closed loop of mesh material and having a handle element connected between the ends of the mesh material to define a vertical slot in the basket sidewall and maintain the rigidity of the basket material while providing a supporting platform for an electric starting element which is removably positioned to extend through the slot.

This and other objects and advantages of this invention will be apparent from the following description made in connection with the accompanying drawing wherein like reference characters refer to similar parts throughout the several views, and in which.

Figure 1:
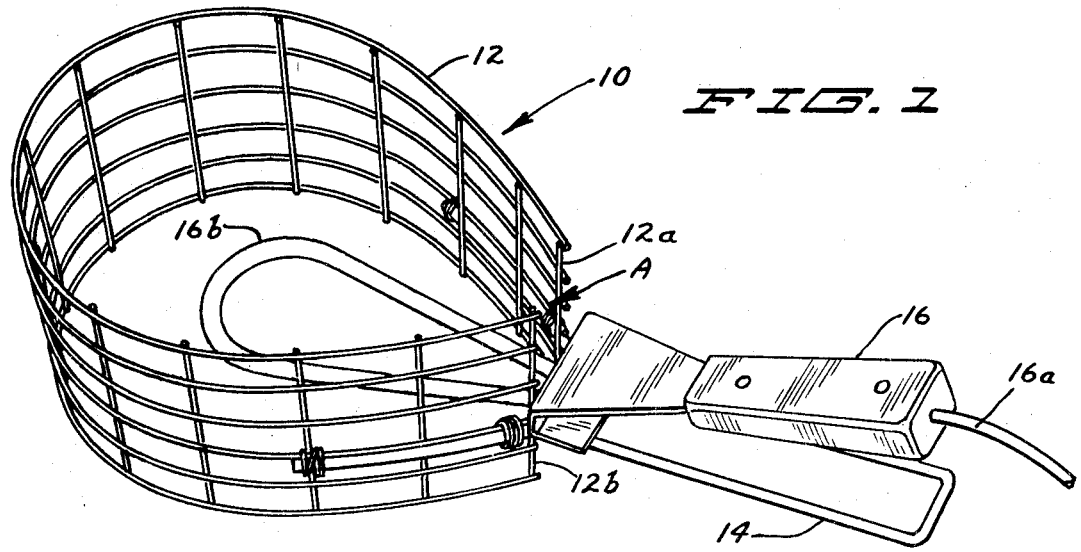
FIG. 1 is a perspective view of one embodiment of my invention.

In FIG. 1, the charcoal starter assembly, according to my invention, is generally designated as reference numeral 10. The basket 12 is formed of a mesh of material which may be of the sort of material that is commonly used in making wire mesh fencing. The mesh is formed in a nearly closed loop making a basket and defining upstanding sidewall portions with the ends of the loop 12a and 12b brought almost but not quite together so as to define a vertical slot, designated A, in the upstanding sidewall of the basket.

A handle element 14, which may be formed of a rod of material formed in the appropriate configuration, is attached to the basket assembly so as to surround the slot A. The handle further defines and maintains the rigidity of the basket element by holding the ends of the mesh material in spaced-apart relationship. As illustrated in FIG. 1, an electric starter element 16 having an electric power cord 16a may be placed on and supported by the handle 14 with the heating loop 16b of the starter element extending through the opening defined by slot A and into the interior of the basket to ignite charcoal briquets placed therein. It is clear that the electric starter 16 may be placed and removed at will by vertical movement into and out of slot A.

Figure 2:
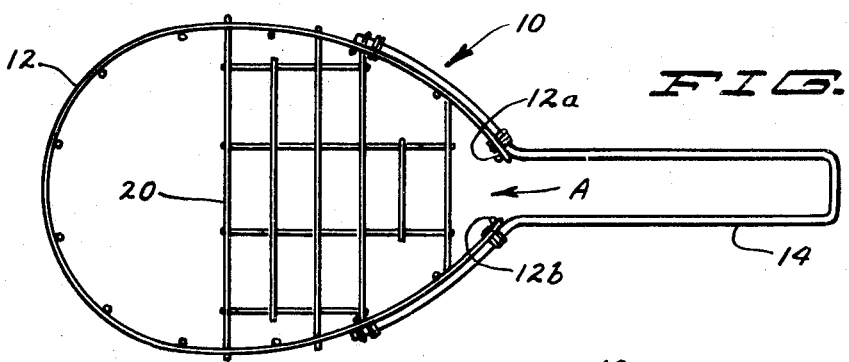
FIG. 2 is a top view of another embodiment of my invention.
Figure 3:
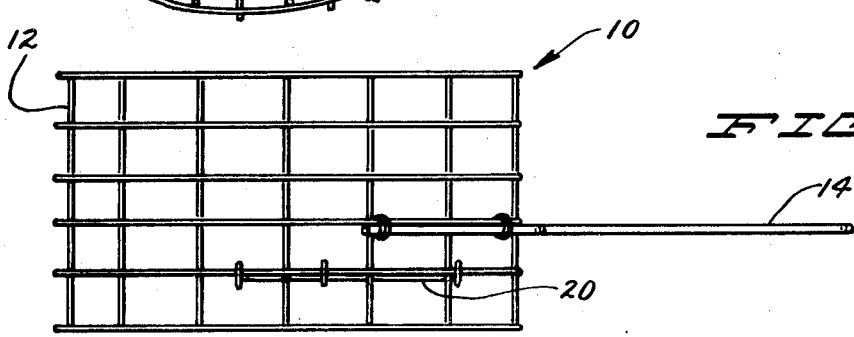
FIG. 3 is a side view of my invention as shown in FIG. 2.

FIGS. 2 and 3 show the same structure as in FIG. 1 in which a partial floor 20 is provided over approximately half of the area of the basket, so as to provide increased ventilation of the charcoal while being started by lifting it above the floor on which the assembly 10 is resting. However, the partial floor 20 allows the ignited charcoal to be released through the open portion of the basket assembly into the desired area and allows the charcoal briquets to be spread around as desired by manipulation of the basket using the handle.

Figure 4:
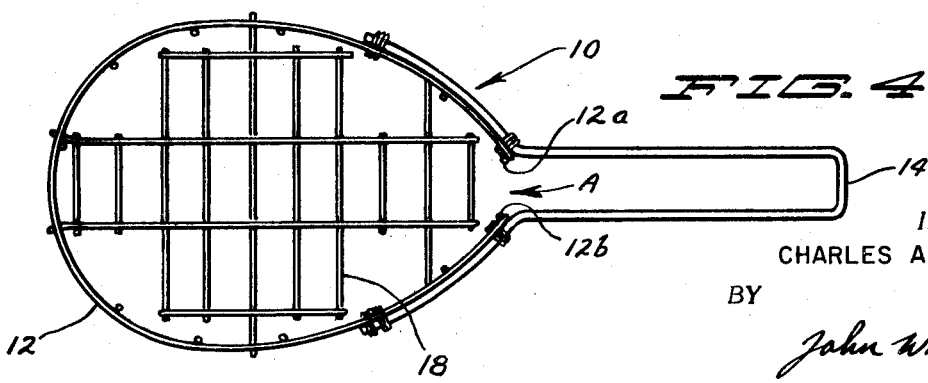
FIG. 4 is a top view of yet another embodiment of my invention.

In FIG. 4, the same structure as in FIG. 1 is shown with the addition of a floor 18 placed in the basket assembly which will support the charcoal briquets at a level above the surface on which the basket assembly is placed so as to give the charcoal more ventilation and air while being started. This variation also allows the use of combustible materials to start charcoal in addition to the electric starter. The combustible materials are placed in the area under the floor 18 while charcoal is placed on the floor, and then the fire is started by first igniting the combustible materials.

In use, it is clear that the electric starting element may be removed from the bed of charcoal without disturbing the basket assembly once the charcoal has become partially ignited and the charcoal allowed to stand in the basket assembly a further period of time until completely ignited. Removal of the electric starter stirs and mixes the partially ignited charcoal and speeds the ignition process while leaving the charcoal in the basket and without further tools or apparatus being required. It can be seen that removing the electric starter before ignition is complete is also advantageous in that the starter is removed from the charcoal bed before a temperature has been reached which may be harmful to the electric starter but before sufficient ignition of the charcoal has occurred to allow disposition of the charcoal in the fire area.

It will be seen that I have provided an inexpensive and efficient assembly to aid in starting a charcoal fire using an electric heating element. The apparatus of this invention can be manufactured from a rectangular piece of wire mesh doubled back upon itself to form a nearly closed loop, the ends of which are held in spaced-apart relationship by a simple handle element thereby forming a slot in the upstanding vertical sidewalls of the basket. This device greatly facilitates starting a charcoal fire using an electric heating element which is allowed to rest on the handle of the basket assembly during the ignition process and which may be removed from the bed of charcoal which is being started in order to stir it and thereby speed the ignition process. It will also be appreciated that the embodiments of my invention, as shown in FIGS. 2 and 4, are also economical to manufacture but provide slightly more ventilation for the charcoal than does the embodiment of my invention as shown in FIG. 1.

It will, of course, be understood that various changes may be made in the form, details, arrangement and proportion of the parts without departing from the scope of the invention, which generally stated, consists in the matter set forth in the accompanying claims.

What is claimed is:

1. A charcoal-starting apparatus comprising,
   a basket made of mesh material and formed by an upstanding sidewall having a top edge, a bottom edge, and two ends with the ends brought together in a spaced-apart relationship so as to form a vertical slot in the upstanding sidewall,
   a handle mounted on said basket and secured to each of said ends to connect said ends to each other and positioned so as to extend outwardly from the slot and positioned between the top edge and the bottom edge of the basket and electric starting element having an elongated handle and an electric igniting portion extending through the slot into the interior of the mesh basket, said elongated handle being removably placed on and supported by the basket handle.

2. The apparatus of claim 1 and a partial floor formed of mesh material mounted in the basket at a position between the bottom edge of the basket and the position of the basket handle and of a size which will permit a substantial body of charcoal to rest thereon during the ignition process but leaving a sufficient area of the basket floor open so that the body of the charcoal may pass downwardly through the open area when the basket is moved.

3. The apparatus of claim 1 and a floor formed of mesh material for providing support for the body of charcoal to be placed in the basket and positioned between the bottom edge of the basket and the mounting position of the basket handle.

* * * * *